United States Patent
Gibbs

(10) Patent No.: US 11,364,756 B2
(45) Date of Patent: Jun. 21, 2022

(54) AMPHIBIAN

(71) Applicant: Gibbs Technologies Ltd., Warwickshire (GB)

(72) Inventor: Alan Timothy Gibbs, London (GB)

(73) Assignee: Gibbs Technologies Ltd., Warwickshire (GB)

( * ) Notice: Subject to any disclaimer, the term of this patent is extended or adjusted under 35 U.S.C. 154(b) by 0 days.

(21) Appl. No.: 16/705,057

(22) Filed: Dec. 5, 2019

(65) Prior Publication Data

US 2020/0290416 A1 Sep. 17, 2020

Related U.S. Application Data

(63) Continuation of application No. 12/999,592, filed as application No. PCT/GB2009/001524 on Jun. 19, 2009.

(30) Foreign Application Priority Data

Jun. 20, 2008 (GB) ..................................... 0811416

(51) Int. Cl.
*B60F 3/00* (2006.01)
(52) U.S. Cl.
CPC .......... *B60F 3/0084* (2013.01); *B60F 3/0007* (2013.01); *B60F 3/0069* (2013.01); *B60F 2301/04* (2013.01)
(58) Field of Classification Search
CPC .... B60F 3/0084; B60F 3/0007; B60F 3/0069; B60F 2301/04

(Continued)

(56) References Cited

U.S. PATENT DOCUMENTS

| 3,755,835 A | 9/1973 | Boersig |
| 4,357,893 A | 11/1982 | Frye |

(Continued)

FOREIGN PATENT DOCUMENTS

| CA | 2239953 A1 | 1/2000 |
| DE | 19831324 A1 | 1/2000 |

(Continued)

OTHER PUBLICATIONS

Webster's New World Dictionary (Third College Edition), Copyright 1988 by Simon & Schuster, Inc.; definition of 'hull', p. 657.

(Continued)

*Primary Examiner* — Daniel V Venne
(74) *Attorney, Agent, or Firm* — Fulwider Patton LLP

(57) ABSTRACT

A two wheeled planing amphibian (10) has a hull (20), bow (24), front wheel (30) and rear wheel (40). Front suspension (32) and rear suspension (42) are retractable, separately or simultaneously. Front wheel (30) may retract vertically or rotationally. Steering is by handlebars (50), link (54), and forks (36). Front wheel (20) may be located outside the hull in both protracted and retracted positions. The underside of hull (20) may be continuous in both land mode and marine mode along and across its centreline from the bow to the rearmost underside point on the hull along the centreline; or from the forwardmost underside point on the hull when it is planing at its lowest speed to the rear. There may be no wheel closures attached to the hull. A wheel bay (22), which is open at its top side, may be provided to allow rear wheel retraction.

7 Claims, 4 Drawing Sheets

(58) Field of Classification Search
USPC .................................. 440/12.5, 12.51, 12.52
See application file for complete search history.

(56) References Cited

U.S. PATENT DOCUMENTS

| | | | |
|---|---|---|---|
| 4,655,310 | A | 4/1987 | Hoshi |
| D295,153 | S | 4/1988 | Ryuzoji et al. |
| D295,273 | S | 4/1988 | Saito et al. |
| D297,132 | S | 8/1988 | Ryuzoji et al. |
| D298,113 | S | 10/1988 | Tamura et al. |
| D298,744 | S | 11/1988 | Saito et al. |
| D299,630 | S | 1/1989 | Matsue |
| D299,631 | S | 1/1989 | Oba et al. |
| D299,707 | S | 2/1989 | Makita et al. |
| 5,690,046 | A | 11/1997 | Grzech, Jr. |
| 6,540,569 | B1 | 4/2003 | Gong |
| 6,640,729 | B1 | 11/2003 | Wei-Bin |
| 6,672,916 | B1 | 1/2004 | Lent-Phillips et al. |
| 6,886,837 | B2 | 5/2005 | Gibbs |
| 6,945,832 | B2 | 9/2005 | Roycroft |
| D511,318 | S | 11/2005 | Sugimoto |
| D515,468 | S | 2/2006 | Inui et al. |
| D529,840 | S | 10/2006 | Sugawara |
| D534,100 | S | 12/2006 | Kinoshita |
| D545,742 | S | 7/2007 | Kinoshita |
| 7,311,567 | B2 * | 12/2007 | Gibbs ...................... B62K 9/00 440/12.5 |
| 7,316,594 | B2 | 1/2008 | Longdill et al. |
| D596,534 | S | 7/2009 | Tashiro |
| D600,165 | S | 9/2009 | Tashiro |
| D601,060 | S | 9/2009 | Kinoshita |
| D601,464 | S | 10/2009 | Tashiro |
| D602,812 | S | 10/2009 | Kinoshita |
| D604,672 | S | 11/2009 | Kinoshita |
| D605,086 | S | 12/2009 | Kinoshita |
| D668,184 | S | 10/2012 | Tashiro |
| 2002/0112907 | A1 * | 8/2002 | Maeda ...................... B62K 5/01 180/69.4 |
| 2003/0060095 | A1 | 3/2003 | Gong |
| 2005/0020149 | A1 | 1/2005 | Bryham |
| 2006/0199449 | A1 | 9/2006 | Longdill et al. |
| 2010/0133772 | A1 | 6/2010 | Marabese et al. |
| 2014/0042200 | A1 | 2/2014 | Namani |

FOREIGN PATENT DOCUMENTS

| | | |
|---|---|---|
| DE | 19926145 A1 | 12/2000 |
| EP | 502830 A1 | 9/1992 |
| FR | 2706547 B1 | 8/1995 |
| GB | 253880 A | 8/1926 |
| GB | 2254831 B | 1/1995 |
| GB | 2397344 B | 8/2005 |
| GB | 2420318 B | 11/2006 |
| JP | 63002712 A | 1/1988 |
| JP | 2004515396 A | 5/2004 |
| JP | 2007196806 A | 8/2007 |
| LU | 84437 A1 | 5/1984 |
| RU | 2297357 C2 | 4/2007 |
| WO | 9109769 A1 | 7/1991 |
| WO | 9429136 A1 | 12/1994 |
| WO | 0244008 A2 | 6/2002 |
| WO | 0245978 A1 | 6/2002 |
| WO | 03051712 A1 | 6/2003 |
| WO | 2005028300 A1 | 3/2005 |
| WO | 2008023191 A2 | 2/2008 |

OTHER PUBLICATIONS

European Patent Office, International Search Report and Written Opinion of the International Searching Authority for PCT International Application No. PCT/GB2009/001524 dated Oct. 14, 2009.

* cited by examiner

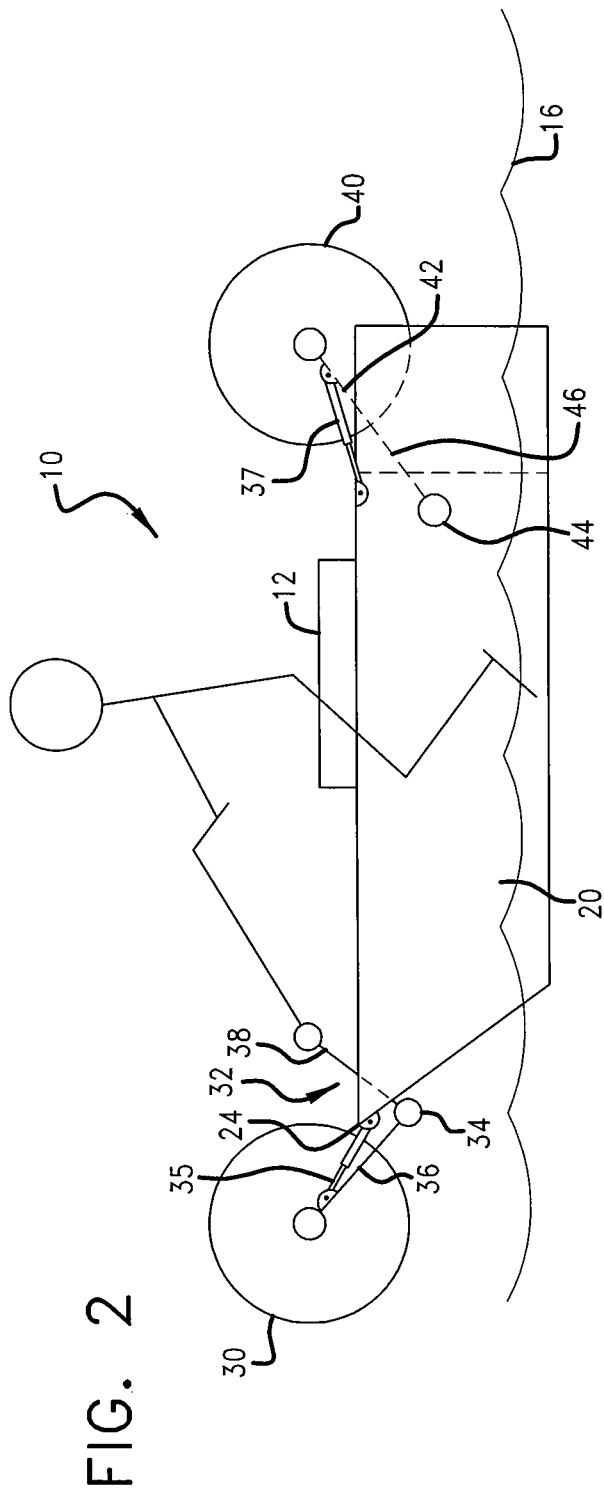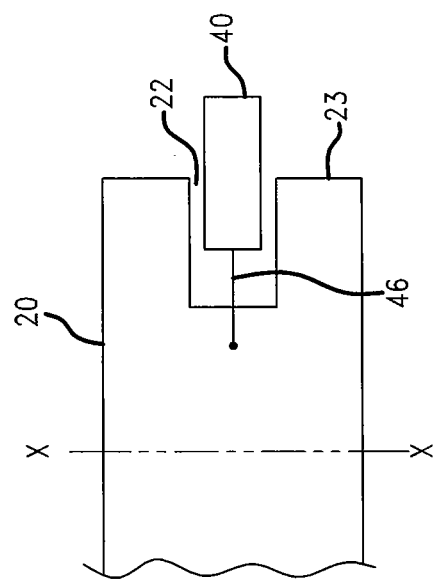
FIG. 2
FIG. 2A

AMPHIBIAN

This application is a continuation of U.S. Ser. No. 12/999,592 filed Jul. 13, 2011, which is a U.S. national phase of PCT/GB2009/001524, filed Jun. 19, 2009, which claims priority from Great Britain Application Serial No. 0811416.7, filed Jun. 20, 2008.

The present invention relates to a two wheel amphibian.

A number of arrangements for amphibians having two wheels have been proposed. For example as known from GB 2 254 831 to Buchanan, or U.S. Pat. No. 6,540,569 to Gong. In both of these known arrangements the front wheel is arranged to retract into a compartment in the hull, which is closed by a retractable wheel cover in order to enable planing of the amphibian. Without such wheel covers, water would impact on the rearward side of the hull compartment, thereby dramatically increasing drag and preventing planing. However, the use of wheel covers has been found to be problematic since the mechanisms which actuate the covers, and the covers themselves, can become jammed with mud or weeds. Furthermore, because of the high impact forces experienced on the underside of the hull during planing, wheel covers can easily be lost, broken, or distorted. Distorted covers may be unable to retract, preventing egress from water, as the wheels cannot be protracted.

In an alternative known arrangement, for example as disclosed in DE 198 31 324 to Lehrberger, the hull is arranged to split along its centreline to reveal both the front and rear wheels. As above, this arrangement is susceptible to becoming jammed with mud and weeds. In addition, this arrangement results in a cumbersome and difficult to ride configuration in land mode.

According to a first aspect of the present invention, there is provided a two wheel planing amphibian for use on land and water, comprising: a hull; a front wheel mounted to the amphibian by a front suspension assembly; a rear wheel mounted to the amphibian by a rear suspension assembly; at least one wheel retraction mechanism for moving the front and rear wheels between a deployed position for use of the amphibian on land, and a retracted position for use of the amphibian on water; wherein the front wheel is located outside the hull in both the deployed and retracted positions.

According to a second aspect of the present invention, there is provided a two wheel planing amphibian for use on land and water, comprising: a hull; a front wheel mounted to the amphibian by a front suspension assembly; a rear wheel mounted to the amphibian by a rear suspension assembly; at least one wheel retraction mechanism for moving the front and rear wheels between a deployed position for use of the amphibian on land, and a retracted position for use of the amphibian on water; wherein the underside of the hull is continuous in both land mode and marine mode along and across its centreline from the bow to the rearmost underside point on the hull along the centreline.

According to a third aspect of the present invention, there is provided a two wheel planing amphibian for use on land and water, comprising: a hull; a front wheel mounted to the amphibian by a front suspension assembly; a rear wheel mounted to the amphibian by a rear suspension assembly; at least one wheel retraction mechanism for moving the front and rear wheels between a deployed position for use of the amphibian on land, and a retracted position for use of the amphibian on water; wherein the underside of the hull is continuous in both land mode and marine mode along and across its centreline from the forwardmost underside point on the hull which intersects the waterline when the amphibian is planing at its lowest speed, to the rearmost underside point on the hull along the centreline.

According to a fourth aspect of the present invention, there is provided a two wheel planing amphibian for use on land and water, comprising: a hull; a front wheel mounted to the amphibian by a front suspension assembly; a rear wheel mounted to the amphibian by a rear suspension assembly; at least one wheel retraction mechanism for moving the front and rear wheels between a deployed position for use of the amphibian on land, and a retracted position for use of the amphibian on water; wherein there are no wheel closures attached to the hull; in particular, to the underside of the hull.

According to a fifth aspect of the present invention, there is provided a two wheel planing amphibian for use on land and water, comprising:
 a hull;
 a front wheel mounted to the amphibian by a front suspension assembly;
 a rear wheel mounted to the amphibian by a rear suspension assembly;
 at least one wheel retraction mechanism for moving the front and rear wheels between a deployed position for use of the amphibian on land, and a retracted position for use of the amphibian on water;
 wherein the front suspension assembly comprises a pivot about which the front wheel is rotated when moved between the deployed and retracted positions.

In preferable embodiments of the first, second, third and fourth aspects of the present invention, the amphibian further comprises a wheel bay, formed in the outside of the hull which allows movement of the rear wheel between the deployed and retracted positions, wherein the wheel bay is open at the top surface of the hull.

In further preferable embodiments of the first, second, third and fourth aspects of the present invention, the front wheel is arranged to move between the deployed and retracted positions by pivoting about a transverse axis.

Alternatively, the front wheel is arranged to move between the deployed and retracted positions along a vertical locus.

In further preferable embodiments of the first, second, third and fourth aspects of the present invention, the amphibian further comprises a chassis section having a projection portion, which extends over the bow of the hull to support the front suspension assembly In further preferable embodiments of the first, second, third and fourth aspects of the present invention, the amphibian further comprises handlebars arranged to control the steering of the amphibian when in use. More preferably, the steering control is relayed from the handlebars to the front wheel by a linkage.

In further preferable embodiments of the first, second, third and fourth aspects of the present invention, a cutout is provided in the bow of the hull to allow movement of the front wheel between deployed and retracted positions.

In further preferable embodiments of the first, second, third and fourth aspects of the present invention, when the wheels are in the retracted position, said wheels are located above the waterline when the amphibian is planing at its lowest speed.

The arrangement of the present invention is advantageous since there is no requirement for moveable hull components and driving mechanisms therefor, either of which may become jammed. Furthermore, because there is no need for wheel covers, there is less likelihood of hull failure. The saving in weight resulting from the omission of these components is particularly important for a planing amphibian, whose weight must be lifted onto the plane; as opposed to displacement amphibians, which merely push water aside.

The present invention will now be described by way of example only with reference to the following figures, in which:

FIG. 2 shows a schematic elevation of the two wheeled amphibian of FIG. 1 in its marine mode configuration;

FIG. 2a shows a schematic plan view of the stern of the amphibian of FIG. 1;

Figure 1:
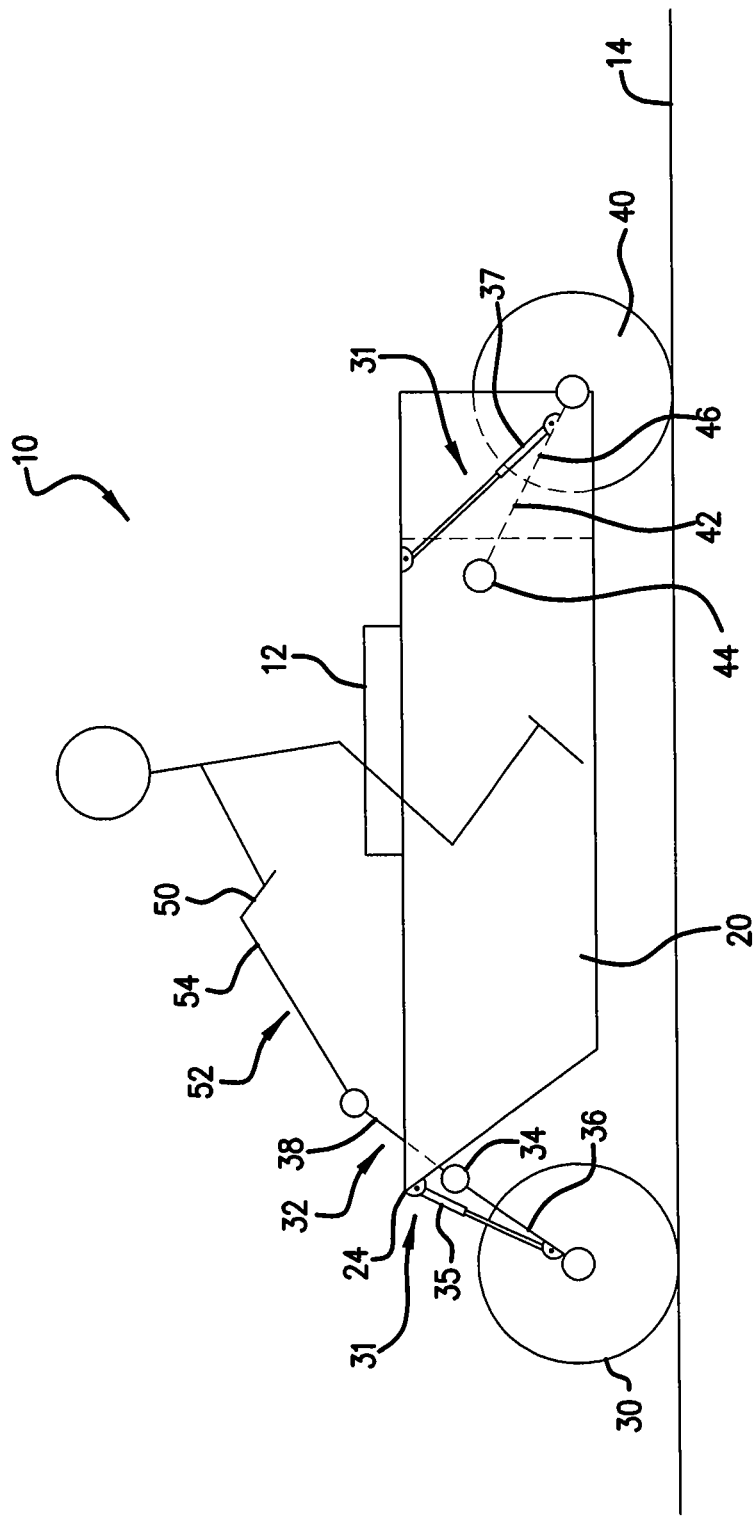
FIG. 1 shows a schematic elevation of a two wheeled amphibian in its land mode configuration.

FIG. 1 shows an amphibian 10 which has a hull 20, a bow 24, and front and rear wheels 30, 40. The front and rear wheels 30, 40 are shown in their deployed position for use of the amphibian on land 14 in its land mode.

The front wheel 30 is mounted to the amphibian 10 by a front suspension assembly 32, and the rear wheel 40 is mounted to the amphibian 10 by a rear suspension assembly 42. A steering assembly 52 comprising handle bars 50 and steering connection link 54 is operatively connected to the front suspension 32 to allow a rider to steer the amphibian 10 by steering the front wheel. A marine steering system for use in or on water may also be controlled by handlebars 50 through a marine steering mechanism (not shown). A seat 12 is also provided.

The front suspension 32 comprises a front connection link 38 which is connected to front forks 36 at pivot 34. The front connection link 38 passes through the hull 20 via watertight sealed bearings (not shown) which allow the front connection link 38 to rotate to allow steering movement, but which seal the hull 20 against water ingress. The front wheel 30 is carried for rotation by the front forks 36.

The rear suspension 42 comprises a rear trailing arm 46 which is mounted at pivot point 44 to the amphibian 10. The opposite end of the trailing arm 46 carries rear wheel 40 for rotation.

The front and rear suspensions are each provided with a wheel retraction mechanism (not shown) which may be arranged to retract both the front and rear wheels at the same time. Alternatively, the wheel retraction mechanism comprises a front wheel retraction assembly and a rear wheel retraction assembly so that the front and rear wheels may be deployed or retracted independently. In one example wheel retraction is achieved by the use of hydraulic struts which may form part of the suspension systems. The struts may be constructed according to the Applicant's patent, U.S. Pat. No. 6,886,837 B2, and may have an intermediate pivot mounting similar to that disclosed in U.S. Pat. No. 6,945,832 B2.

FIG. 2 shows the amphibian 10 with the front and rear wheels 30, 40 in the retracted position for use of the amphibian on water 16 in its marine mode.

As can be seen, the front wheel 30 has been retracted to a position in front of the bow 24 and above the waterline 16 by the articulation of the front forks 36 about pivot 34. Because the front wheel 30 must not foul the bow 24 as it moves, or while it is at rest, the front forks 36 are provided with hydraulically controlled telescoping rods (not shown) which extend as the front wheel 30 is retracted. These telescoping rods may form part of the front suspension. The front wheel 30 is held in this position by the retraction mechanism, and may be locked in place by any suitable means; for example, by mechanical or hydraulic locking.

The rear wheel 40 is retracted to a position above the waterline by articulation of the rear trailing arm 46 about pivot point 44. The rear wheel 40 is held in this position by the retraction mechanism which may be locked in place, for example, by a strut locking peg according to GB 2 397 344 B.

The hull 20 comprises a rear wheel bay 22 located in the stern (FIG. 2a). In this example, the rear wheel 40 is partially positioned within the rear wheel bay 22 in both the land mode and marine mode configurations. Alternatively, the rear wheel may be located aft of the stern 23 in the land and/or marine mode configurations. In either configuration described above, the rear wheel is located on the wet side of the hull, rather than in an interior compartment. It is therefore outside the hull in both retracted and protracted positions. It is important to draw a distinction between the rear wheel bay shown in the Figures, which is open at the top, and a wheel recess, as disclosed in prior art, which is closed at the top. In particular, if an exhaust outlet is located in bay 22, an open top to the bay will allow some upward water dispersal, making it less likely that the backwash which hits the amphibian when it comes off the plane will flow into the exhaust system, potentially damaging both exhaust system and engine.

FIG. 2a also shows a sample transverse axis X-X of the amphibian. This is an axis across the amphibian from left to right, when the amphibian is standing upright on level ground. The rear wheel and optionally the front wheel may retract around axes parallel to axis X-X.

Whilst in the above the term land mode is generally associated with the wheels in the deployed position, and the term marine mode is generally associated with the wheels in the retracted position, it will be understood that the wheels may be deployed when the amphibian is in water. For example, on entry or exit of the amphibian into or out of the water; or for low speed displacement travel in crowded areas such as marinas.

Figure 3:
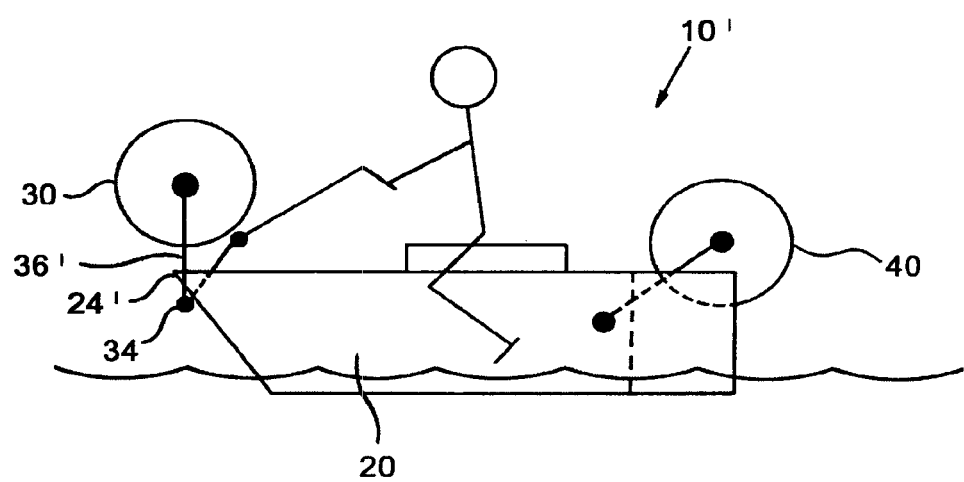
FIG. 3 shows a first alternative marine mode configuration.

An alternative arrangement of a two wheeled amphibian 10' is shown in FIG. 3. In this example, the front forks 36' are shaped and positioned so as to pass to either side of the point of the bow 24' when the front wheel 30 is retracted or protracted.

Figure 4:
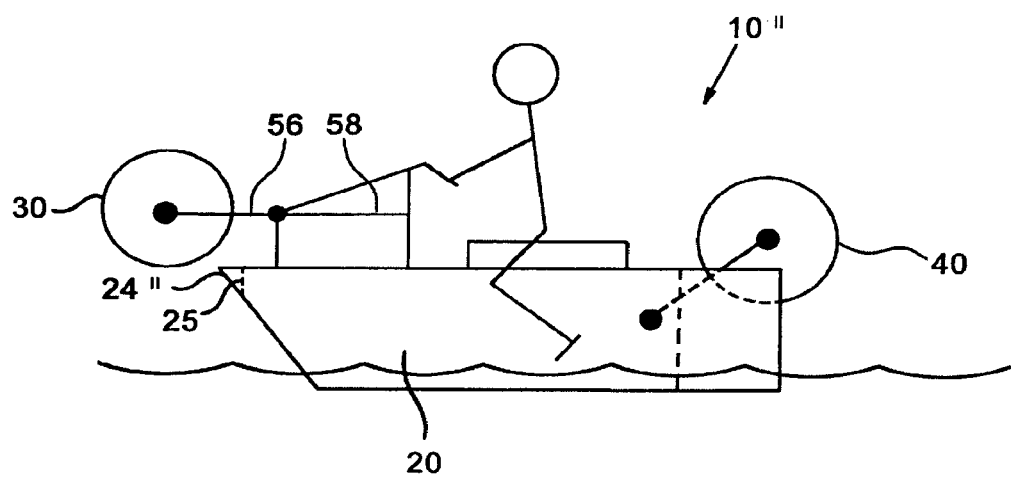
FIG. 4 shows a second alternative marine mode configuration.

A still further example of a two wheeled amphibian 10" is shown in FIG. 4. In this example the front wheel 30 is mounted to the amphibian 10" by chassis assembly 58 which has a projection portion 56 extending over the bow 24". The projection portion 56 supports the front wheel 30, via the front suspension (not shown). The front wheel 30 is constrained to vertical deployment and retraction by the retractable front suspension (not shown). That is to say, the wheel retracts and protracts in a vertical locus. For clarity, such a vertical locus would be at right angles to axis X-X in FIG. 2a, passing from top to bottom of the amphibian when it is upright on level ground, and perpendicular to said level ground. This vertical movement may be effected by one or more hydraulically controlled telescoping rods. Preferably, a cutout 25 in bow 24" is provided, through which wheel 30 may pass during deployment or retraction. Like the wheel bay 22 described above with reference to FIG. 2a, this cutout is open at the top of the hull. Alternatively, the front wheel may be mounted on articulating forks as described above with reference to FIGS. 1 and 2.

Each of the amphibians 10, 10', 10" described above comprise a power unit, such as a petrol or diesel engine, which is adapted to drive the amphibian in both its land mode and marine mode. The power unit may drive one or both of the wheels in land mode, and may also drive a water propulsion device, such as a water jet drive or propeller, in marine mode. Alternatively, the water drive power unit and land drive power unit may be separate. Suitable power take off(s) and gearing are provided.

Although item 20 has been described above as a hull, it is common for amphibians to have a hull, which is a lower, water-facing enclosure; and a body, which is an upward enclosure. These may be joined together at a peripheral joint, as disclosed in the applicant's co-pending application, published as US 2006/0,199,449A1. In the current application, however, a singular hull is shown and described, for reasons of clarity. It will be appreciated that in practice, a separate upper body may also be provided. This may be to provide attractive styling of the amphibian; to provide sealing of the steering system against water ingress; and to provide mountings for desirable equipment such as an instrument console and a windscreen.

It is conventional automotive engineering to provide a unitary bodyshell. This presents particular challenges when applied to amphibians. The lower part of such a body when fitted to an amphibian must be regarded as a hull, because it faces water, must be sealed against water, and must withstand water forces e.g. slamming loads if the amphibian porpoises.

An issue of general concern for users of two-wheeled vehicles or amphibians is that of lateral stability. An amphibian can take advantage of its dual-purpose nature. The longitudinally central section of the amphibian must be wasted to allow the rider to put at least one foot down to keep the amphibian upright when stationary in traffic. Forward and aft of the centre, however, the common provision of a vee type hull allows the two wheel amphibian to be wider than a conventional motorcycle without added risk of grounding when the amphibian leans into corners. If buoyancy foam is added at the outer edges of the vee type hull, this will add minimal weight on land, but will add substantial buoyancy on water.

The amphibian is provided without a wheel closure. The term "closure" means anything which closes a fixed aperture—including a panel, cover, canopy, or lid. Such a closure may comprise one or more components; and may be closed by manual or powered means. It may rotate, slide, or close in some other way. Generally, a closure moves to close off apertures of a hull, which are underwater when the amphibian is stationary and on the water. Such closures allow planing when in a closed position. The term wheel closure includes a cover that at least partially closes a cavity in the hull in which the wheel is situated when retracted. The term also includes a cover that together with the hull at least partially encapsulates the wheel when retracted. The term also includes a cover which is movable between a position which does not cover a wheel and a position which does cover a wheel, from any angle, so as to form a substantially smooth and unbroken hull or body outer surface. Therefore, a closure is distinguished from a mud guard, which is permanently deployed whether the wheel is deployed or retracted, and does not move from one position to another during normal operation of the amphibian. Generally, a closure will be located below the wheel when closed. A mud guard will often be fixed to the body work and located above the wheel. When a mud guard is mounted on the forks supporting the wheel, it will be held in a fixed relationship to the wheel. Its orientation may vary as the wheel is deployed or retracted, however unlike a closure, it will not cover a gap in the hull.

The outside or wet side of the hull is a side of the hull exposed to water; as opposed to the inside of the hull, which is dry, being effectively sealed against water ingress. It is acknowledged that a conventional engine compartment requires ingress and egress of air for cooling, combustion and exhaust purposes; but even such air intakes and exhaust openings have labyrynthine passages, commonly known as dorades, in order to exclude as much water as possible.

Although the front and rear wheels have been described in the above as single unitary components, it should be understood that the front and/or rear wheel may comprise two or more individual wheels mounted in close proximity on a common axle such that the two or more wheels effectively form a single wheel.

Any of the features of any example may be combined with any other feature from any of the examples.

The invention claimed is:

1. A two wheel planing amphibian for use on land and water, comprising:
  a hull;
  a front wheel mounted to the amphibian by a front suspension assembly;
  a rear wheel mounted to the amphibian by a rear suspension assembly;
  at least one wheel retraction mechanism for moving the front and rear wheels between a deployed position for use of the amphibian on land, and a retracted position for use of the amphibian on water;
  wherein the front wheel is located outside the hull in both the deployed and retracted positions; and
  wherein the front wheel is arranged to move between the deployed and retracted positions by pivoting about a transverse axis.

2. A two wheel planing amphibian according to claim 1, further comprising a wheel bay, formed in the outside of the hull which allows movement of the rear wheel between the deployed and retracted positions, wherein the wheel bay is open at the top surface of the hull.

3. A two wheel planing amphibian according to claim 1, wherein the front wheel is arranged to move between the deployed and retracted positions along a vertical locus.

4. A two wheel planing amphibian according to claim 3, further comprising a chassis assembly having a projection portion, which extends over the bow of the hull to support the front suspension assembly.

5. A two wheel planing amphibian according to claim 1, further comprising handlebars arranged to control the steering of the amphibian when in use.

6. A two wheel planing amphibian according to claim 1, wherein a cutout is provided in the bow of the hull to allow movement of the front wheel between deployed and retracted positions.

7. A two wheel planing amphibian according claim 1 wherein in the retracted position, the wheels are located above the waterline when the amphibian is planing at a lowest speed of the two wheel planing amphibian.

* * * * *